(12) United States Patent
Kang

(10) Patent No.: US 8,445,259 B2
(45) Date of Patent: May 21, 2013

(54) METHOD AND APPARATUS FOR TREATMET OF SLUDGE

(76) Inventor: Seok-woong Kang, Anyang-si (KR)

(*) Notice: Subject to any disclaimer, the term of this patent is extended or adjusted under 35 U.S.C. 154(b) by 334 days.

(21) Appl. No.: 12/675,957

(22) PCT Filed: Sep. 2, 2008

(86) PCT No.: PCT/KR2008/005147
§ 371 (c)(1),
(2), (4) Date: Mar. 1, 2010

(87) PCT Pub. No.: WO2009/031796
PCT Pub. Date: Mar. 12, 2009

(65) Prior Publication Data
US 2010/0255562 A1 Oct. 7, 2010

(30) Foreign Application Priority Data
Sep. 3, 2007 (KR) .................. 10-2007-0088858

(51) Int. Cl.
C02F 3/34 (2006.01)

(52) U.S. Cl.
USPC ................ 435/262; 435/161; 210/603

(58) Field of Classification Search
USPC ......... 435/262, 289.1, 299.1, 300.1; 252/373; 210/603, 615, 150
See application file for complete search history.

(56) References Cited

U.S. PATENT DOCUMENTS

2008/0020456 A1* 1/2008 Choate et al. .............. 435/290.4
2008/0045762 A1* 2/2008 Foody et al. ................. 585/240

FOREIGN PATENT DOCUMENTS

JP 11010191 A 1/1999
JP 16160343 A 6/2004
JP 17238103 A 9/2005

OTHER PUBLICATIONS

International Search Report of International Application No. PCT/KR2008/005147.

* cited by examiner

Primary Examiner — Michael Marcheschi
Assistant Examiner — Shanta G Doe
(74) Attorney, Agent, or Firm — Kile Park Reed & Houtteman PLLC

(57) ABSTRACT

An enhanced apparatus and a method for treating organic sludge is constructed such that the sludge is first dewatered with a first dewatering device; the dewatered sludge is passed through a thermal hydrolysis reactor to hydrolyze polymers contained in the dewatered sludge, the hydrolyzed sludge is passed through a digester to digest the hydrolyzed sludge anaerobically, the digested sludge is passed through a second dewatering device to dewater the anaerobically digested sludge to form dewatered cake, solution generated in dewatering with the second dewatering device is passed through a crystallization reactor to crystallize and the remove phosphorus and nitrogen in the solution, and the dewatered cake by the second dewatering device is passed through an incineration or high temperature melt processing apparatus to incinerate or melt the dewatered cake.

6 Claims, 2 Drawing Sheets

METHOD AND APPARATUS FOR TREATMET OF SLUDGE

TECHNICAL FIELD

The present invention relates to an advanced apparatus and a method for treating sludge, which is constructed so that water contained in foul water or wastewater sludge is removed with a dewatering device to lower the percentage of moisture content of the sludge in order to remove nutritional salt material such as nitrogen and phosphorus, which is mixed in foul water or wastewater purifying sludge, food waste, sewage and livestock excretion, etc. and becomes main cause of eutrophication; dewatered sludge is passed through a thermal hydrolysis reactor to decompose a polymer formed spontaneously in the dewatered sludge and cell membrane of an organism; the resulting sludge is passed through a digester; the digested sludge is dewatered with a dewatering device, and the resulting dewatered cake is treated by incinerating to a fertilizer, melting, carbonizing or solidifying; at is least one selected from magnesium, potassium, zinc, calcium carbonate, phosphoric acid and calcium is poured in order to remove the nutritional salt material such as phosphorus and nitrogen contained in a solution generated during dewatering, and is passed through a crystallization reactor to crystallize into MAP struvite (magnesium ammonium phosphate) crystal product or diferrent crystal products and then remove it; a remaining solution is fed back to a step prior to the biological reactor.

BACKGROUND ART

General sewage, food waste and livestock excretion contain much phosphorus and nitrogen that contaminate a river or seawater through eutrophication. However, since there is not present an apparatus for treating sludge equipped with separate step for treating such phosphorus and nitrogen efficiently, there is a problem that sludge containing much phosphorus and nitrogen is discharged thereby contaminating a river or seawater seriously.

In conventional advanced process for treating foul water or wastewater, some sludge sedimented at the bottom of a first sedimentation tank are transferred to a dewatering device, a solution located at the top is transferred to a biological reactor that enhances proliferation of microorganisms by dissolving oxygen in air, and BOD (Biochemical oxygen demand) is removed and phosphorus and nitrogen that greatly influences eutrophication are removed by action of microorganisms in the biological reactor. There is a problem that since sludge is digested under a condition of interrupting oxygen supply in an anaerobic digester included in usual process for treating foul water or wastewater, phosphorus present in a solution through being discharged again by microorganisms that took it previously, and nitrogen added from sludge during digestion and dewatering steps are transferred to the biological reactor together with dewatered solution, and thus excess nitrogen and phosphorus are present in main step.

DISCLOSURE OF INVENTION

Technical Problem

An object of the present invention to be solved lies in providing a method that lowers the amount of sludge by passing through thermal hydrolysis and digestion step before dewatering sludge of sewage or wastewater sludge, food waste and livestock excretion, etc.; produces methane gas as a by-product of the step; and removes efficiently nutrient salt material such as phosphorus and nitrogen that is included in sludge thereby causing eutrophication.

Another object of the present invention to be solved lies in optimizing crystallization condition to remove efficiently nutrient salt material such as phosphorus and nitrogen that is included in foul water or wastewater treatment sludge such as sewage, food waste and livestock excretion thereby causing eutrophication.

Another object of the present invention to be solved lies in providing a method that energy generated during the thermal hydrolysis step is fed back to recycle, and methane gas generated in digester is used as energy to heat a boiler in order to supply energy necessary for thermal hydrolysis or used for generating electricity.

Technical Solution

According to one aspect of the invention, there are provided an enhanced apparatus and a method for treating sludge, which is constructed so that concentrated sludge is first dewatered with a dewatering device; dewatered sludge is passed through a thermal hydrolysis reactor to decompose a polymer formed spontaneously in the dewatered sludge and cell membrane of an organism; since microorganisms discharge absorbed phosphorus, at least one selected from magnesium, potassium, zinc, calcium carbonate, phosphoric acid and calcium is is poured in order to remove phosphorus, nitrogen and various material contained in a solution generated during dewatering by crystallization them into struvite, and is passed through a crystallization reactor to crystallize into struvite and then remove it; a remaining solution after crystallization is fed back to a step prior to the biological reactor or the digester, thereby removing nutritional salt material such as nitrogen and phosphorus, which is included in foul water or wastewater sludge such as sewage, food waste, and livestock excretion, etc. thereby causing eutrophication.

According to another aspect of the invention, there are provided an enhanced apparatus and a method for treating sludge, which is constructed so that the pouring amount of $Mg^{2+}$ or $Mg^{2+}$ and $PO_4^3$, pH and reaction time, etc. are controlled, the pouring molar ratio of $Mg^{2+}:NH_4^+:PO_4^{3-}$ is adjusted to 1.0 to 1.4:0.8 to 1.0 to 1.4, and MAP struvite crystallization reactor is maintained under pH of alkaline 9 to 12, thereby achieving rapid and efficient crystallization to remove efficiently nutrient salt material such as phosphorus and nitrogen that is included in foul water or wastewater such as sewage, food waste and livestock excretion thereby causing eutrophication.

According to another aspect of the invention, there are provided an enhanced apparatus and a method for treating sludge, which is constructed so that the pouring amount of $Mg^{2+}$ or $Mg^{2+}$ and $PO_4^3$ is controlled in optimum amount, thereby producing a fertilizer such as good MAP in the crystallization step efficiently in maximum.

Advantageous Effects

The present invention has an effect of removing rapidly and efficiently nutrient salt material such as phosphorus and nitrogen that is included in foul water or wastewater such as sewage, food waste and livestock excretion thereby causing eutrophication, through performing multiple steps.

Another effect of the present invention lies in optimizing conditions to remove efficiently nutrient salt material such as phosphorus and nitrogen that is included in foul water or wastewater such as sewage, food waste and livestock excretion thereby causing eutrophication; increasing the efficiency of removing the material by solidification; and using solidified good MAP, etc. as a fertilizer.

Another effect of the present invention lies in feeding heat generated during the heat hydrolysis step back to recycle, and supplying energy necessary for thermal hydrolysis by methane gas generated in digester or using such energy for generating electricity; thus saving energy and using energy efficiently.

Figure 1:
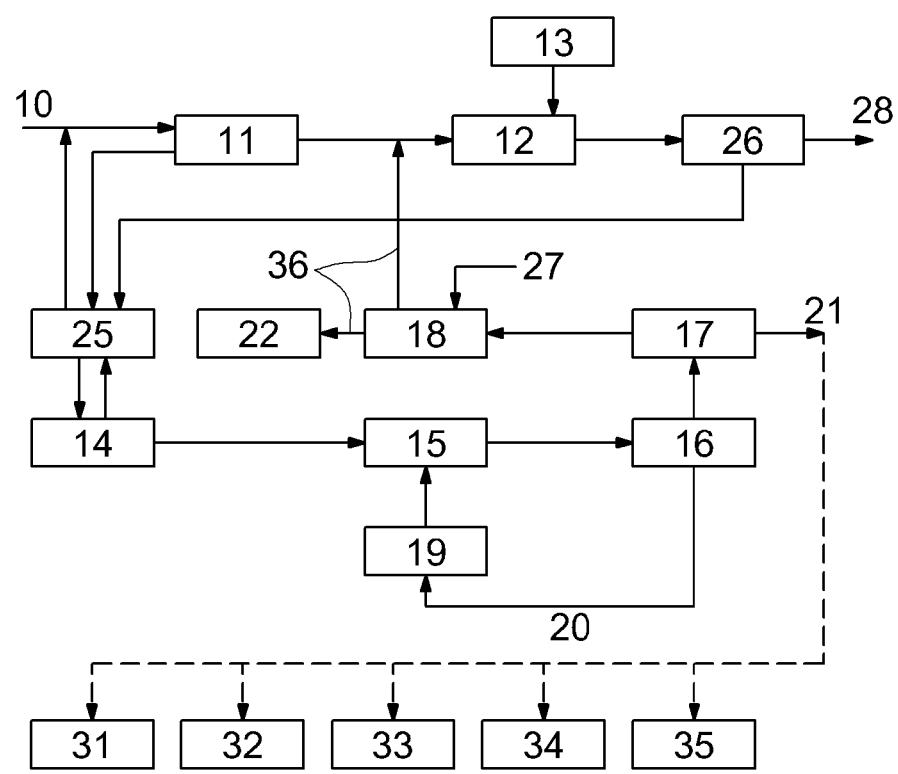
FIG. 1 illustrates a whole construction of an advanced apparatus for treating sludge according to the present invention.

DESCRIPTION OF DRAWING REFERENCE NUMBERS 11. sedimentation tank
12. biological reactor
13. microorganism
14. dewatering device
15. thermal hydrolysis reactor
16. digester
17. dewatering device
18. crystallization reactor
19. boiler
20. methane gas
21. dewatered cake
22. reservoir
23. control tank
24. heat recovery tank
25. concentration tank or dewatering device
26. sedimentation tank
27. crystallization material
28. disinfection-discharge

BEST MODE FOR CARRYING OUT THE INVENTION

The present invention relates to an enhanced apparatus and a method for treating sludge, which is designed and manufactured so that in order to remove nutritional salt material such as nitrogen and phosphorus, which is included in foul water or wastewater sludge thereby causing eutrophication, foul water or wastewater is sedimented in a first sedimentation tank and sedimented product is concentrated; the foul water or wastewater solution at the top is transferred to a biological reactor and microorganisms are poured thereto for microorganisms to remove a nutrient material and phosphorus and nitrogen that are eutriphication material; a solution containing sludge treated biologically is transferred to a second sedimentation tank, and supernatant is disinfected and then discharged, and sedimented product is concentrated together with the sediment of the first sedimentation tank by employing a concentration tank or a dewatering device; concentrated sludge is to dewatered with a first dewatering device to lower the amount of sludge and then dewatered sludge is passed through a thermal hydrolysis reactor to hydrolyze polymers including protein, carbohydrate and lipid, contained in dewatered sludge, thereby discharging phosphorus and nitrogen contained by microorganisms in some extent; phosphorus and nitrogen contained by microorganisms are discharged on digestion in an anaerobic digester properly controlling supply of nutrient source, temperature and pH; digested sludge is dewatered with a dewatering device; dewatered sludge is transferred to a crystallization reactor that a crystallization material is poured to form MAP struvite crystal product or various crystal products in order to remove nutrient salt material such as phosphorus and nitrogen, and at least one crystallized material selected from magnesium, potassium, zinc, calcium carbonate, phosphoric acid and calcium is poured to remove by crystallization; and a remaining solution after crystallization is fed back to a step prior to the biological reactor or the digester thereby being removed again through enhanced treatment process.

Since the solution passed through the dewatering device 17 contains phosphorus and nitrogen, crystallization reactor 18 is set next to the second dewatering device 17 in order to remove phosphorus and nitrogen efficiently through a step for crystallizing them into the MAP struvite crystal product. Crystallization material 27 of $Mg^{2+}$ or $Mg^{2+}$ and $PO_4^{3-}$ is poured into the crystallization reactor 18 in a certain quantity to crystallize into MAP($Mg^{2+}NH_4^+PO_4^{3-}$), and then the crystallized product is discharged outside to store at a reservoir 22 for crystallized products for use as good fertilizer. An aqueous solution remaining after crystallization step is recycled to a step prior to the biological reactor 12 or the digester to remove again sludge, phosphorus and nitrogen. These steps are repeated in certain times.

Since the crystallization reactor 18 depends greatly on the pouring amount of $Mg^{2+}$ or $Mg^{2+}$ and $PO_4^{3-}$, pH and reaction time, etc., optimum reaction condition must be satisfied in order to achieve efficient crystallization reaction. In order to achieve efficient reaction in the crystallization reactor 18, when the pouring molar ratio of $Mg^{2+}:NH_4^+:PO_4^{3-}$ is adjusted to 1.0 to 1.4:0.8 to 1.0 to 1.4, and crystallization reactor is maintained under pH of alkaline 9 to 12, crystallization efficiency becomes greatly high thereby achieving efficient crystallization and elevating treatment speed due to rapid reaction.

Further, the present invention also relates to an advanced method for treating sludge wherein biological reaction step is performed so that phosphorus and nitrogen are removed by employing microorganisms; dewatering step is performed to lower the percentage of moisture content of the sludge in which microorganisms containing phosphorus and nitrogen are included; dewatered sludge resulting from dewatering step is subjected to thermal hydrolysis step to decompose the polymers present in a solution; the resulting product is transferred to an anaerobic digester and subjected to digestion step to digest organic sludge; the sludge after digestion step is subjected to dewatering, and thus nitrogen and phosphorus present in some microorganisms are incinerated, carbonized, melted, or solidified to a fertilizer as dewatered cakes having the percentage of moisture content below 70% together with microorganisms; since the solution discharged during dewatering contains much phosphorus and nitrogen because microorganisms alive in the digestion step discharge phosphorus and nitrogen during digestion in an anaerobic digester, the solution is transferred to crystallization reactor 18 to remove phosphorus and nitrogen present in the solution, and $Mg^{2+}$ or $Mg^{2+}$ and $PO_4^{3-}$ is poured into the crystallization reactor in a certain quantity to crystallize, and then the MAP converted to struvite crystal product is transferred to a reservoir 22 for crystallized products for use as good fertilizer; a solution generated during crystallization step is recycled to a step prior to the biological reactor or the digester to remove phosphorus and nitrogen again.

MODE FOR THE INVENTION

Figure 2:
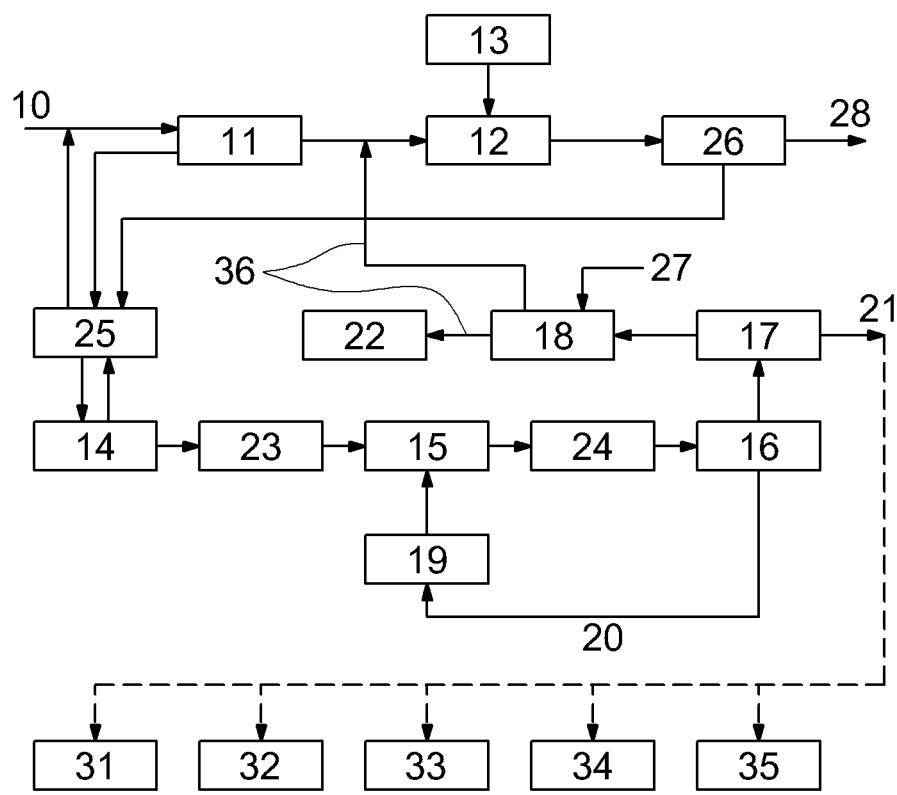
FIG. 2 illustrates another whole construction of an advanced apparatus for treating sludge according to the present invention.

Embodiments of the present invention will be described based on the drawings. FIG. 1 depicts a whole construction of an advanced apparatus for treating sludge according to the present invention. FIG. 2 depicts another whole construction of an advanced apparatus for treating sludge according to the present invention.

In an embodiment of the present invention and another embodiment thereof, dewatering device 14, 17 is made up of one selected from a belt press, a filter press, and a dewatering device and a centrifuge employing air pressure.

A solution exited on concentration or dewatering is fed back to any step of prior end to retreat, or is purified and then disinfected to discharge.

Hereinafter, construction elements according to the present invention are described in more detail. In general, since phosphorus and nitrogen are present in the amount of about hundreds to thousands mg per one liter in usual sludge contained in sewage sludge, food waste and livestock excretion, etc., the usual sludge greatly influences eutrophication of a river and a seawater. In particular, significantly high concentrations of phosphorus and nitrogen are contained in pig excretion.

The biological reactor 12 is constructed so that microorganisms may eat out BOD load material, which is nutrient source contained in foul water or wastewater inlet 10, and phosphorus and nitrogen, which are eutrophication sources. Phosphorus gone into a microorganism is partly removed together with the microorganism during dewatering with a dewatering device 17; however, since a usual apparatus for treating sludge discharges phosphorus, which microorganisms contain, during a digestion step in an anaerobic digester 16, and thus phosphorus and nitrogen are present together with nitrogen added from microorganisms in a solution exited from the dewatering device 17 during a step for treating dewatered cake 21.

Since the solution passed through the dewatering device 17 contains phosphorus and nitrogen, crystallization reactor 18 is set next to the second dewatering device 17 in order to remove phosphorus and nitrogen efficiently through a step for crystallizing them into MAP. Crystallization material 27 of $Mg^{2+}$ or $Mg^{2+}$ and $PO_4^{3}$ is poured into the crystallization reactor 18 in a certain quantity to crystallize into MAP($Mg^{2+}$ $NH_4^+PO_4^{3-}$), and then the crystallized product is discharged outside to store at a reservoir 22 for crystallized products for use as good fertilizer. An aqueous solution remaining after crystallization step is recycled to a step prior to the biological reactor 12 or the digester to remove again sludge, phosphorus and nitrogen. These steps are repeated via a means 36 in certain times.

An enhanced apparatus for treating foul water or wastewater sludge can be constructed by further including a usual incineration apparatus 31 for incinerating cake dewatered with the dewatering device 17, or a high temperature melt processing apparatus 32 for melt processing the cake.

An enhanced apparatus for treating foul water or wastewater sludge can be constructed by further including an apparatus selected from a usual sludge solidifying apparatus 33 for solidifying the cake dewatered with the dewatering device 17 in order to use as a cover soil material, a usual sludge carbonizing apparatus 34 for carbonizing in order to recycle as an industrial material, and a usual sludge dryer 35 for drying in order to use as a fuel.

In the apparatus according to the present invention, a step for incinerating or melting the cake dewatered with the dewatering device can be further included, and a step selected from a step for solidifying the dewatered cake in order to use as a cover soil material, a step for carbonizing in order to recycle the cake as an industrial material, and a step for drying the cake in order to use as a fuel can be further included.

The crystallization step can enhance crystallization efficiency and reaction speed when a crystal core is poured in proper quantity. An example of the crystal core includes pre-crystallized struvite sludge. Struvite sludge is a crystallized body bound in molar ratio of $Mg^{2+}:NH_4^+:PO_4^{3-}=1:1:1$, and is in general said as the MAP struvite crystal product.

The form of its solid state is present as two types, i.e., $MgNH_4PO_4$(MAP) or $MgNH_4PO_4.H_2O$(MAP Hydrate). The MAP is used as a fertilizer for gardening, a seedling, a golf course and various soils.

Mg can be poured in the state of MgO, MgOH or $MgSO_4.H_2O$. In order to increase crystallinity, $PO_4^{3-}$ can be poured using $KH_2PO_4$ The apparatus is constructed so that its dewatering efficiency can be elevated through hydrolyzing microorganism cells contained in sludge and chain-form polymers by heating them for 30 minutes to one hour under the condition of the inside temperature of the thermal hydrolysis reactor 15 at 150° C. to 250° C. and the pressure at 3 to 12 bars; then digesting the resulting product in the digester 16; and then dewatering the product with the dewatering device 17. The apparatus can be constructed so that it has preheating pretreatment step before dewatered sludge is transferred to thermal hydrolysis reaction 15 by setting control tank 23 after lowering the percentage of moisture content with the dewatering device 14.

Energy can be saved by constructing the apparatus so that since the thermal hydrolysis reactor 15 requires heat of 150° C. to 250° C. and the digester next to the reactor 15 must be maintained below 40° C., a heat recovery tank 24 is set between the thermal hydrolysis reactor and the digester in order to recycle the heat of the thermal hydrolysis reactor 15, and the recovered heat can be employed in maintaining the preheating pretreatment step of the at least one control tank 23 and/or the digester 16 at a constant temperature. Since the thermal hydrolysis reactor 15 discharges, in some extent, phosphorus and nitrogen which microorganisms absorbed during thermal hydrolysis reaction, phosphorus and nitrogen are present in the sludge.

The digester 16 according to the present invention can be constructed so that the sludge having a temperature of 35° C. to 40° C. suitable to mesophilic or thermophilic is digestion produces a fatty acid or a volatile acid by microorganisms such as bacteria contained in the sludge with employing nutrients and energy sources which the sludge has; produced fatty acid lowers the quantity and odor of the sludge through a step for generating carbon dioxide ($CO_2$) and methane gas ($CH_4$); and the methane gas generated as a by-product is supplied as energy required to a boiler 19 for heating the thermal hydrolysis reactor 15 or used as an energy source of generating electricity or heating.

The apparatus according to the present invention can be constructed so that a means for controlling feed of nutrient source to sludge, temperature and pH properly is included in order to effect digestion efficiently at the digester 16, equilibrium can be achieved on forming an acid and methane gas through such control, and a digestion sludge as an end product consists of volatile and non-volatile particles, and thus if dewatered, can increase the percentage of dewatering while not emitting special odor.

The present invention can be designed and manufactured so that the sludge thermally-hydrolyzed in the thermal hydrolysis reactor 15 without performing digestion step employing the digester is passed through a dewatering device, and some sludge are treated as dewatered cakes, and the solution generated during dewatering is transferred to the crystallization reactor 18 to crystallize and then remove phosphorus and nitrogen contained in the solution.

Another enhanced apparatus for treating sludge according to the present invention can be designed and manufactured so that the sludge thermally-hydrolyzed in the thermal hydrolysis reactor 15 is transferred to the crystallization reactor 18 to crystallize and then remove phosphorus and nitrogen contained in the solution, the MAP struvite crystal product converted to solid by crystallization reaction in the crystallization reactor 18 is transferred to a reservoir 22 for crystallized product to store and use as good fertilizer, the solution generated in crystallization step is transferred to the digester to digest, and then dewatered with a dewatering device to form dewatered cake and remaining solution is fed back to prior step.

Another enhanced apparatus for treating sludge according to the present invention can be designed and manufactured so that the solution generated in crystallization step is fed back to the digester, and the sludge passed through crystallization step and digestion step is dewatered to form sludge cake and remaining solution is fed back to prior step.

An enhanced apparatus for treating usual sludge contained in sewage, food waste and livestock excretion according to the present invention can include a thermometer, a pressure gauge, a common sensor for monitoring the quantity of stored sludge and other necessary sensors required in each step so that each step can be controlled efficiently and automatically.

An enhanced apparatus for treating foul water or wastewater sludge according to the present invention can include an apparatus control unit with a built-in PLC or microprocessor and memory, and control program in order to control efficiently engaged with valves and various sensors equipped to perform the multiple steps smoothly. The apparatus is constructed so that the apparatus control unit can be worked manually or automatically if needed engaged with a control button to work each step manually if needed, a pump to transfer sludge to necessary step according to the order, and valves that are set to a pipe, i.e., a side of a pipe to which sludge is transferred, and thus are opened and shut manually or automatically if needed.

The apparatus control unit includes a display panel for user's convenience, and a means for monitoring whether each step is normally worked engaged with various sensors, or inputting a value required in control of each step, thereby setting and storing it.

A sedimentation tank, a biological reactor, a dewatering device, a thermal hydrolysis reactor, a digester and a crystallization reactor that are employed in the enhanced apparatus for treating sludge according to the present invention can be equipped with multiple numbers in parallel, or with omitting unnecessary apparatus. The apparatus consists of biological reaction step, dewatering step, thermal hydrolysis step, digestion step and crystallization step of the enhanced method for treating sludge according to the present invention, but can include further intermediate steps if needed. For example, sedimentation step employing a sedimentation tank to sediment sludge and control step by equipping with a control tank for preheating pretreatment prior to thermal hydrolysis step can be further included, and some steps can be omitted if needed.

INDUSTRIAL APPLICABILITY

The present invention can provide an enhanced apparatus and method for treating sludge that includes a biological reactor, a dewatering device, a thermal hydrolysis reactor, a digester and a crystallization reactor, and discharges nutritional salt material such as phosphorus and nitrogen contained in foul water or wastewater, etc. thereby causing eutrophication after removing the material by elevating the removing efficiency through optimization of conditions and solidification, and thus prevents eutrophication of a river and seawater and can use solidified MAP as good fertilizer, and can feed back the heat generated during thermal hydrolysis step to recycle, and can provide energy required in thermal hydrolysis by methane gas generated in the digester or can use in generating electricity to save energy and use it efficiently, and thus industrial applicability according to the present invention is very high.

What is claimed is:

1. A method for treating foul water or wastewater treatment sludge containing sewage, food waste and livestock excretion comprising:
   first dewatering to lower the percentage of moisture content of the sludge containing microorganisms that absorb phosphorus and nitrogen after a step of biological reaction;
   thermally hydrolyzing to hydrolyze polymers contained in the dewatered sludge after transferring the dewatered sludge to a thermal hydrolysis reactor;
   digesting after transferring the sludge passed through the thermal hydrolysis step to an anaerobic digester;
   second dewatering to treat the sludge passed through the digestion step to form dewatered cake having low percentage of moisture content;
   crystallizing phosphorus and nitrogen contained in solution remained after dewatering the sludge to form dewatered cake; and
   incinerating or melting the cake dewatered through the second dewatering.

2. The method according to claim 1, further including transferring a crystal product generated during the crystallizing step to a reservoir in order to use as a fertilizer, and feeding a solution resulting from crystallizing step back to the step of biological reaction.

3. The method according to claim 1, wherein in the crystallizing step, a certain quantity of magnesium or magnesium and phosphoric acid is poured simultaneously to form a MAP struvite crystal product, and an alkali aqueous solution is poured to maintain pH at 9 to 12.

4. The method according to claim 1, further including a step selected from a step for solidifying the cake dewatered through the second dewatering in order to use as a cover soil material, a step for carbonizing the cake dewatered through the second dewatering in order to recycle as an industrial material, and a step for drying the cake dewatered through the second dewatering in order to use as a fuel.

5. The method according to claim 2, wherein in the crystallizing step, a certain quantity of magnesium or magnesium and phosphoric acid is poured simultaneously to form a MAP struvite crystal product, and an alkali aqueous solution is poured to maintain pH at 9 to 12.

6. The method according to claim 2, further including a step selected from a step for solidifying the cake dewatered through the second dewatering in order to use as a cover soil material, a step for carbonizing the cake dewatered through the second dewatering in order to recycle as an industrial material, and a step for drying the cake dewatered through the second dewatering in order to use as a fuel.

* * * * *